United States Patent [19]
Colamussi

[11] Patent Number: 5,391,046
[45] Date of Patent: Feb. 21, 1995

[54] AUTOMATED APPARATUS FOR LOADING AND UNLOADING MOTOR VEHICLES

[75] Inventor: Arturo Colamussi, Ferrara, Italy

[73] Assignee: Vortex Systems S.r.l., Fossalta, Italy

[21] Appl. No.: 76,150

[22] Filed: Jun. 14, 1993

[30] Foreign Application Priority Data

Jun. 15, 1992 [IT] Italy ............ MI92 A 001465

[51] Int. Cl.⁶ .................. B65G 67/02; B65G 67/26
[52] U.S. Cl. ................. 414/667; 414/573; 414/392; 414/399; 414/788; 414/907; 414/401; 414/584; 104/35
[58] Field of Search ............ 414/341, 375, 390–393, 414/395, 396, 401, 398–400, 573, 584, 667, 671, 274, 275, 788, 907, 672; 198/346.1, 468.6; 104/35, 46

[56] References Cited

U.S. PATENT DOCUMENTS

| | | | |
|---|---|---|---|
| 4,289,442 | 9/1981 | Stevens | 414/629 |
| 4,718,810 | 1/1988 | Hoehn et al. | 198/346.1 X |
| 4,832,170 | 5/1989 | Takeuchi et al. | 198/346.1 |
| 4,941,794 | 7/1990 | Hara et al. | 414/341 |
| 5,054,987 | 10/1991 | Thornton | 414/390 |
| 5,082,415 | 1/1992 | Hayashi | 414/392 X |

FOREIGN PATENT DOCUMENTS

| | | | |
|---|---|---|---|
| 0299912 | 1/1989 | European Pat. Off. | B65G 67/02 |
| 0346292 | 12/1989 | European Pat. Off. | B66F 9/065 |
| 3316419 | 11/1984 | Germany | B65G 67/04 |
| 1228235 | 6/1991 | Italy | B65G 67/20 |
| 2201938 | 9/1988 | United Kingdom | B65G 67/02 |

*Primary Examiner*—David A. Bucci
*Assistant Examiner*—Stephen Gordon
*Attorney, Agent, or Firm*—Cushman, Darby & Cushman

[57] ABSTRACT

An automated apparatus for loading and unloading motor vehicles, to be positioned between a loading platform and a vehicle positioning region, includes a frame movable longitudinally to the loading platform, a manipulator-conveyor unit provided with lifting and/or gripping devices and arranged on a support element rotatable through at least 180°, the manipulator-conveyor unit being extendable so as to be movable to a position above the loading platform and to a position above the load floor of a vehicle, features being provided for correctly aligning the support element with the load floor, a central processor also being connected to the apparatus. Sensors are associated with the manipulator-conveyor unit for sensing its movement above the support element and are connected to the central processor and to an actuator which correctly positions at least one pair of motorized wheels supporting the manipulator-conveyor unit.

10 Claims, 8 Drawing Sheets

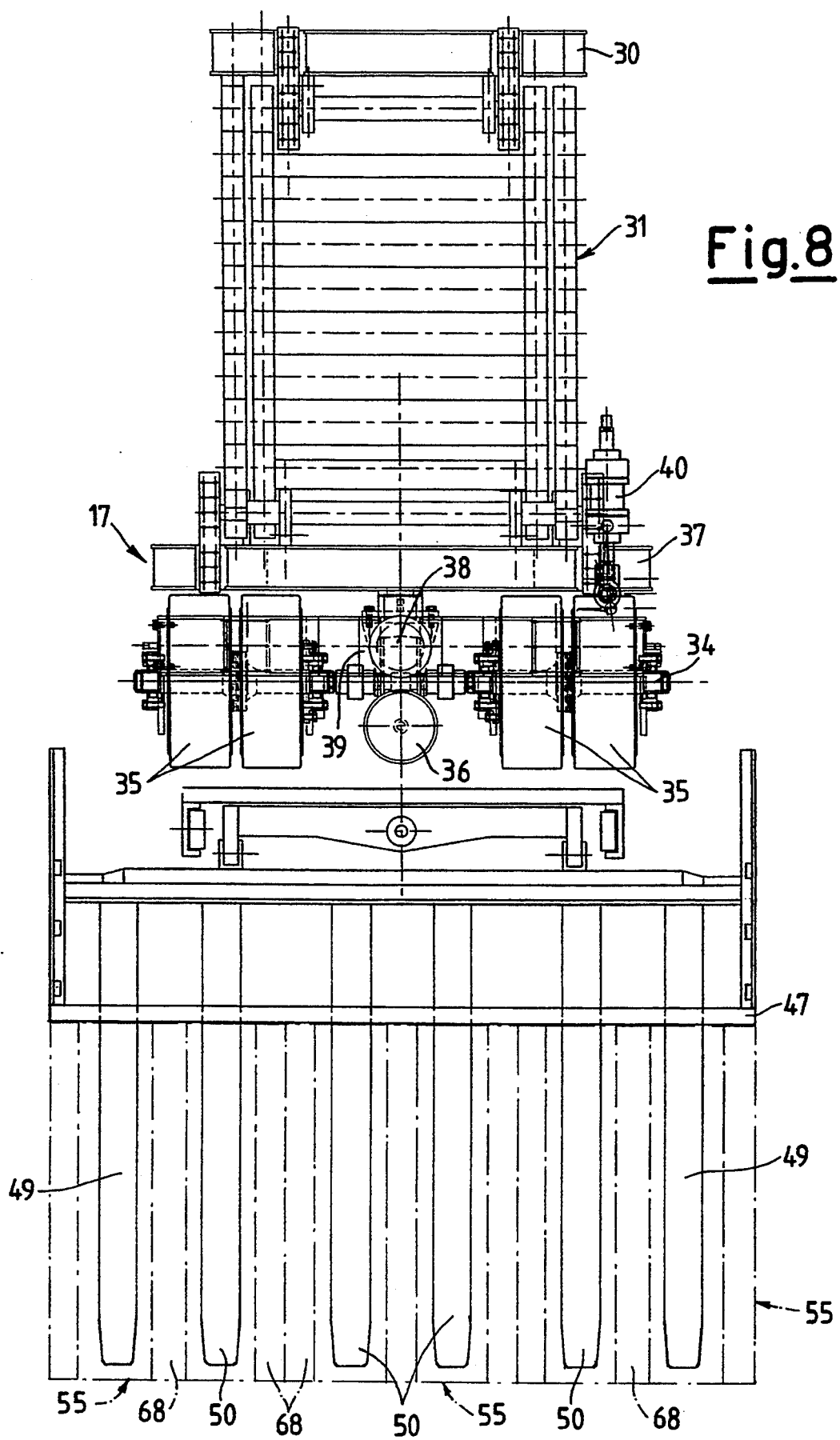

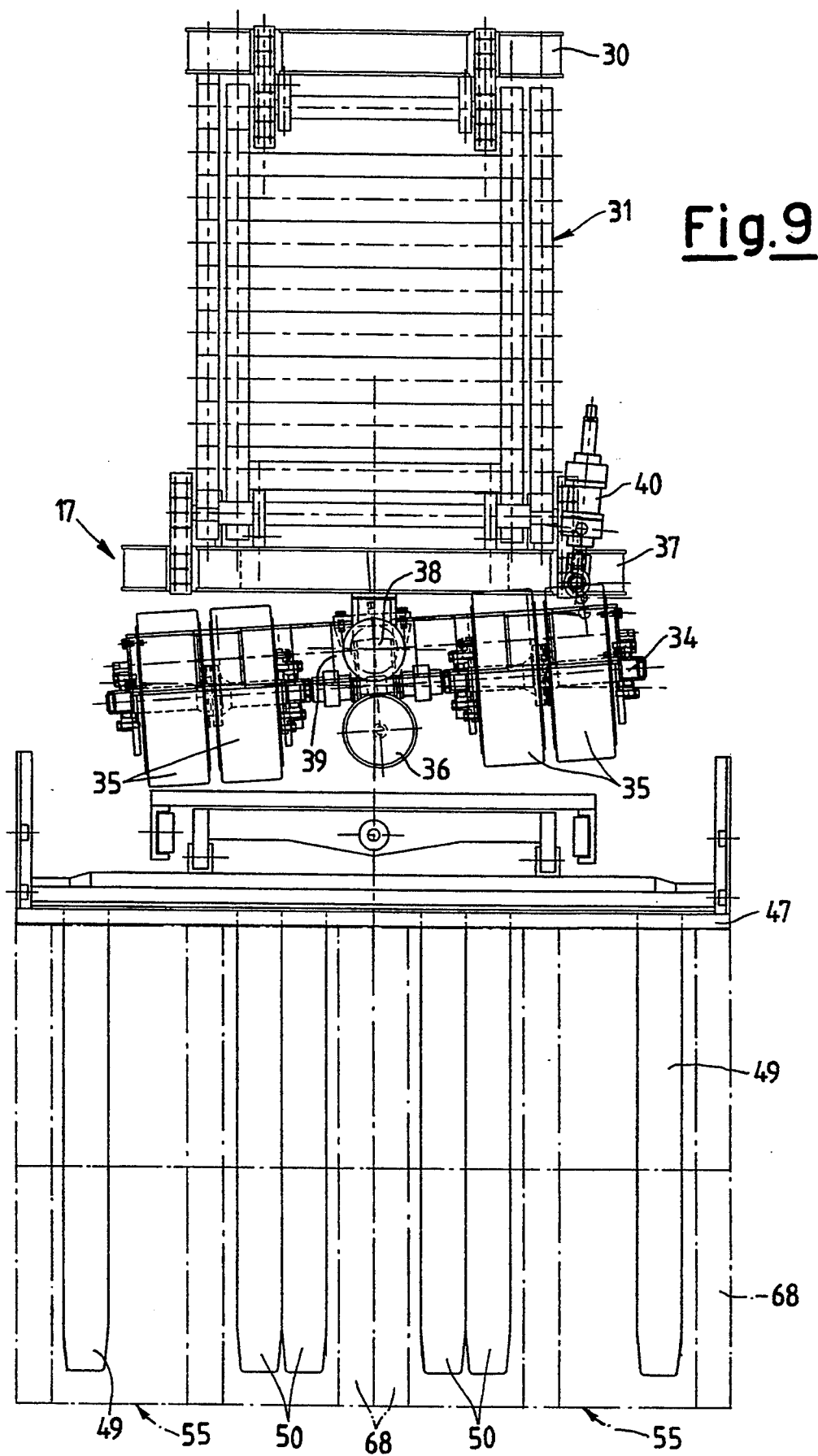

5,391,046

AUTOMATED APPARATUS FOR LOADING AND UNLOADING MOTOR VEHICLES

BACKGROUND OF THE INVENTION

This invention relates to an automated apparatus for loading and unloading motor vehicles.

The apparatus of Italian patent 1,228,235, to which reference should be made as the state of the art, was constructed for use in rapidly and flexibly loading and- /or unloading motor vehicles in which the load is arranged either on pallets or the like or individually.

This Italian patent relates to an apparatus for automatically loading and unloading motor vehicles, where the term "motor vehicle" means either a truck with full trailer or a tractor with semitrailer, to be loaded through a rear door.

In using the apparatus of that Italian patent various problems were encountered, to the extent that it was not possible to achieve maximum reliability and versatility.

In this respect, the lifting and/or gripping means associated with the manipulator-conveyor unit were unable to ensure straight-line movement of the unit either along the loading/unloading platform in the loading station or within the vehicle body.

A reason for this non-uniform and not always correct movement is that the pallets or other load supports to be handled are not of sufficient size to totally contain the loaded products within their base perimeter. This is further emphasized if the products are not correctly positioned with the result that they extend beyond the base perimeter. Such variations make it almost impossible to insert the thus-loaded pallets into the vehicle.

A further contributing factor is that the vehicle does not always have perfectly vertical walls because of the difference in type diameters, different suspension heights etc. The pallet being inserted tends to jam at its guide rollers, which are provided to the side of the manipulator-conveyor unit to facilitate the movement of the pallets and their insertion into the vehicle. It has also been observed that such an apparatus is unable to solve the problems connected with possible differences in the relative loading arrangement of rectangular pallets.

In this respect, because of the standard width of a vehicle load floor and in order to optimize and stabilize its weight distribution, the pallets have to be arranged variably and/or alternately in making up the transverse rows. As the pallets are rectangular, with their two side dimensions (for example 800 mm and 1200 mm) being different sub-multiples of the same possible loading width (2400 mm) between the inner walls of the vehicle, the pallets have necessarily to be arranged by being rotated through 90° one to the other in the two cases.

SUMMARY OF THE INVENTION

The object of the present invention is to provide an apparatus able to obviate the aforesaid drawbacks, and hence allow rapid and reliable loading and/or unloading of such motor vehicles. This object is attained according to the present invention by an automated apparatus for loading and unloading motor vehicles, to be positioned between a loading platform and a vehicle positioning region and comprising a base frame movable longitudinally parallel to the loading platform, a manipulator-conveyor unit provided with lifting and/or gripping means and arranged on a support element rotatable through at least 180° above the base frame, the manipulator-conveyor unit being extendable in an essentially horizontal direction to enable that end thereof carrying the lifting and/or gripping means to be moved to a position above the loading platform and to a position above the load floor of one of the vehicles respectively, means being provided for correctly aligning the support element of the manipulator-conveyor unit with the load floor of one of the vehicles, a central processor also being connected to the apparatus, characterised in that means are associated with the manipulator-conveyor unit for sensing its movement above the support element and are connected to the central processor and to an actuator which correctly positions at least one pair of motorized wheels supporting the manipulator-conveyor unit. Preferably the sensing means comprise at least one laser emitter and a laser receiver, these being positioned on a fixed part of the support element and on the manipulator-conveyor unit respectively.

Advantageously the manipulator-conveyor unit is provided with forks which can be moved in a substantially horizontal plane transversely to its direction of movement, by actuators associated with it. With the underside of a slide table supported above the support element there are associated vibrator elements in combination with horizontally movable vertical walls for containing pallets holding products to be loaded onto and unloaded from the motor vehicles. In addition, to a longitudinal end of the slide table supported above the support element there is hinged a rotatable flat extension acting as a positionable connection surface both to the load floor and to the platform.

BRIEF DESCRIPTION OF THE DRAWINGS

The characteristics and advantages of an apparatus according to the present invention will be more apparent from the description given hereinafter by way of non-limiting example, with reference to the accompanying drawings, in which:

FIGS. 8 and 9 are top plan views showing the fork part of the manipulator-conveyor unit in two different operating positions.

DETAILED DESCRIPTION

Figure 1:
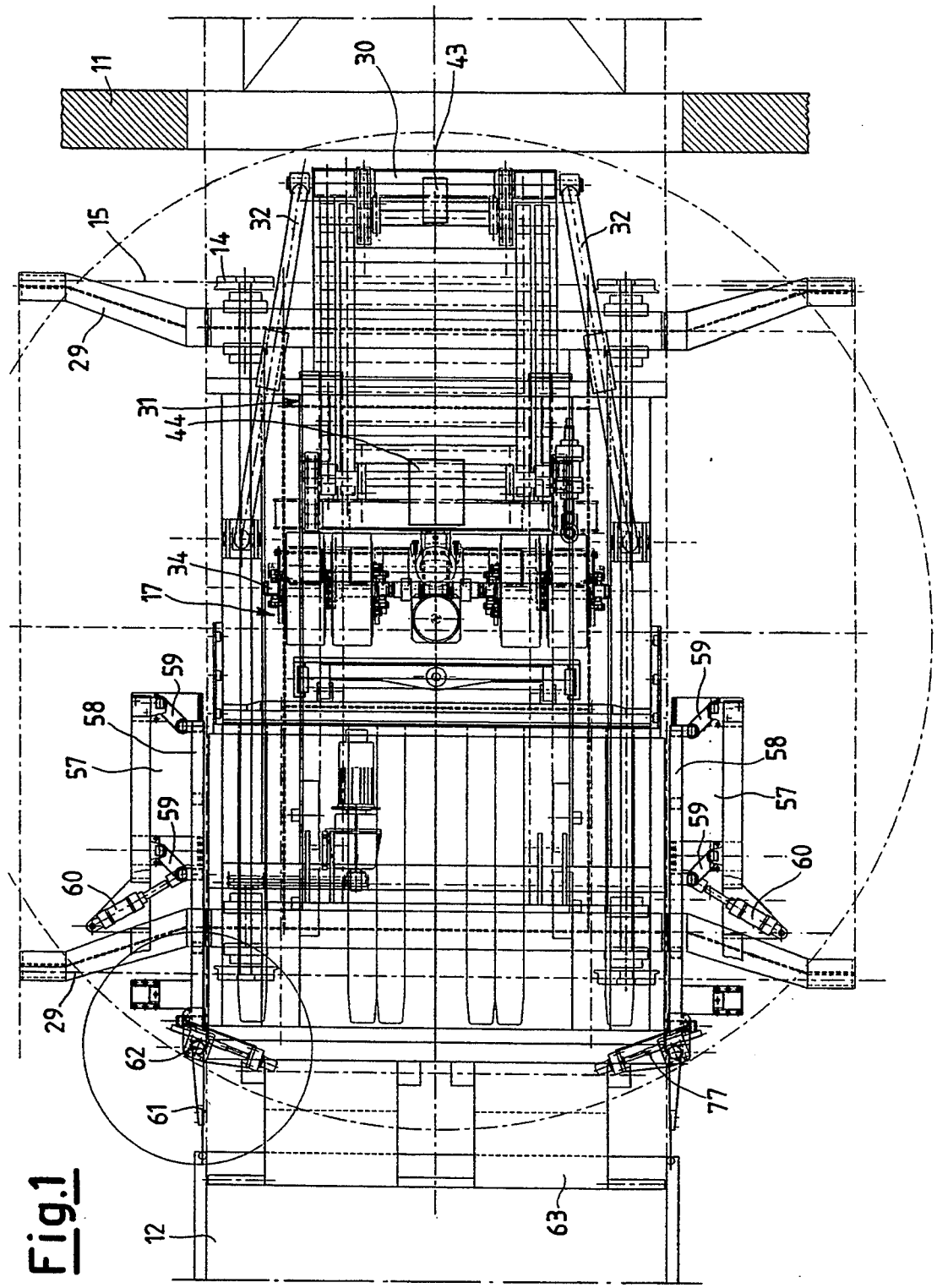
FIG. 1 is a top plan view of an apparatus according to the present invention.

The figures show an automated apparatus for loading and unloading motor vehicles according to the present invention.

Such an apparatus is positioned between a platform in a loading/unloading station 11 and a motor vehicle, partly shown at 12 and positioned against the apparatus. The apparatus comprises a base frame 13 movable longitudinally parallel to the loading-unloading platform 11 by motorized wheels 14 on rails 15.

Figure 2:
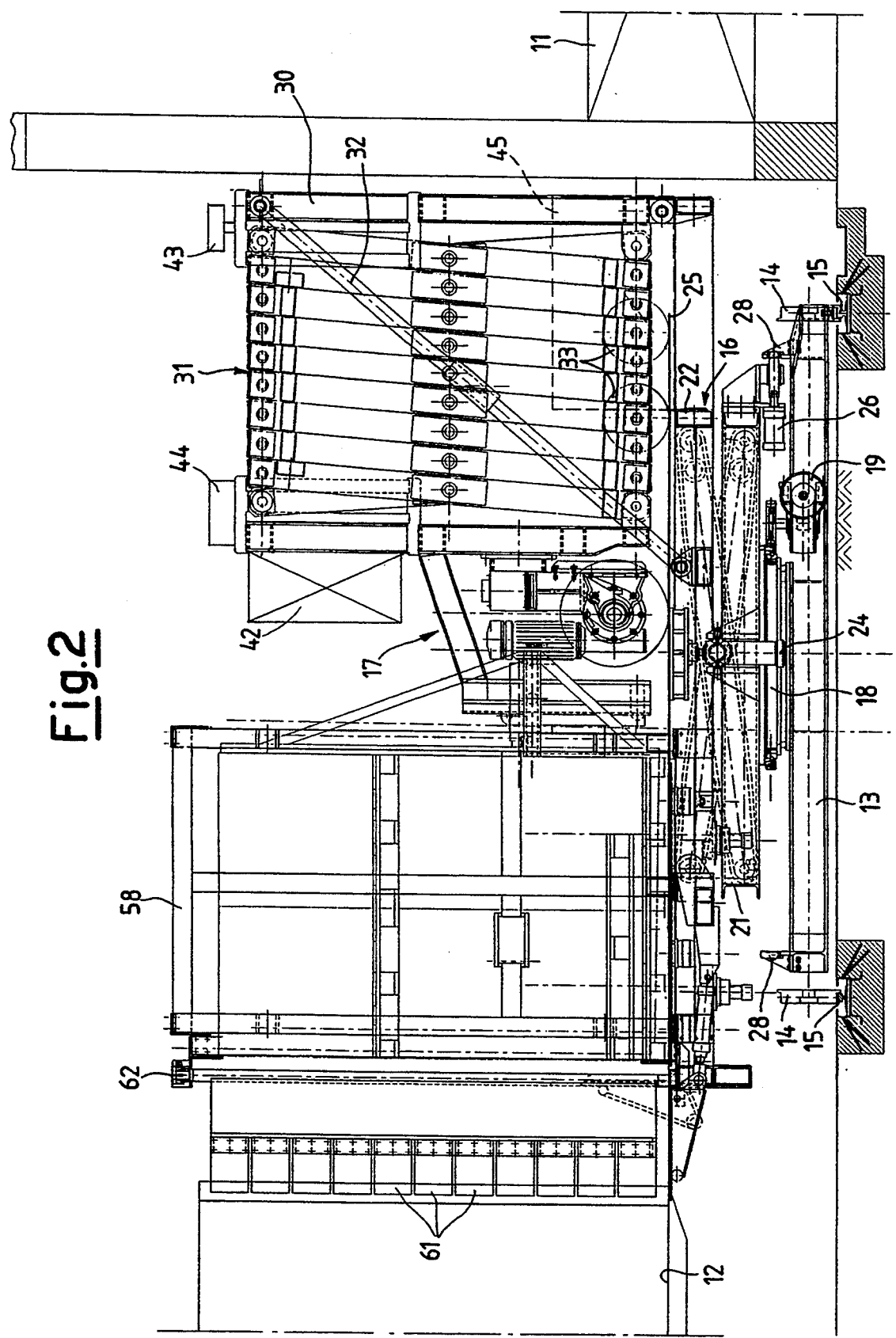
FIG. 2 is a side elevation of the apparatus of FIG. 1.
Figure 3:
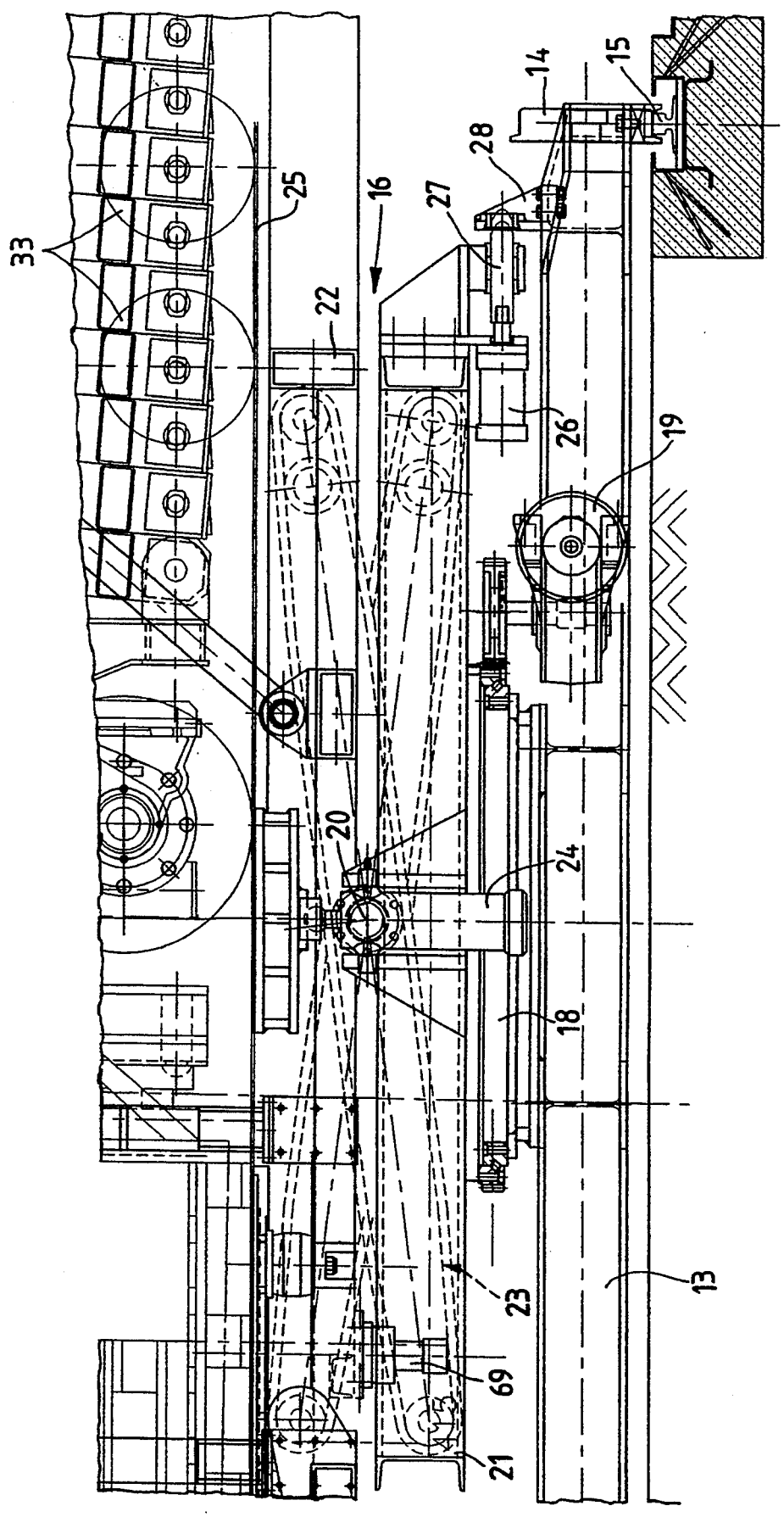
FIG. 3 is an elevational view of an enlarged detail of the central support part of the apparatus.

FIGS. 1 and 2 show the overall apparatus according to the invention, consisting essentially of a support element 16 rotatably arranged in the manner of a platform on the base frame 13, and on which a manipulator-conveyor unit 17 traverses.

The support element 16 or rotatable platform comprises a toothed thrust bearing 18 driven by a geared motor 19 rigid with the base frame 13 and rotatable about a central axis through at least 180° on the base frame 13. Rigid with the toothed thrust bearing 18, there is a lower first plate 21 connected to an upper second plate 22, which is vertically movable by pantograph levers 23. The upper plate 22 is lowered and raised by a central actuator such as a hydraulic cylinder 24 fixed to the lower plate 21 and connected to the upper plate 22 by way of a ball joint 20.

The second plate 22 is inserted below a slide table 25 for the manipulator-conveyor unit 17. The first plate 21 also carries an actuator such as a cylinder 26, positioned radially thereto and with its rod 27 selectively insertable into two brackets 28 extending from the base frame 13. The two brackets 28 are positioned on opposite sides in a direction perpendicular to that in which the apparatus moves along the platform 11, to act as elements for stabilizing the position of the rotatable support element 16 when in the loading and unloading position, respectively.

Projecting laterally from the slide table 25, there are provided four stabilizer elements 29 which graze the rails 15 in the manner of shoes so as to act to prevent any unbalancing of the apparatus. The slide table 25 is of substantially rectangular elongated shape, one end of it being connected to the manipulator-conveyor unit 17 via a portal structure 30 and an articulated pantograph 31. The portal structure 30 is maintained stably vertical with the aid of a pair of inclined struts 32 at the sides of the slide table 25. At least two of the constituent bars of the articulated pantograph 31 are provided with wheels 33 which cooperate in the traversing of the pantograph 31 along the slide table 25.

At the other end of the pantograph 31 there is the manipulator-conveyor unit 17, which can extend in order to move that of its ends provided with lifting and/or gripping means in an essentially horizontal direction as far as a position above the loading platform 11 and a position above a vehicle load floor 12, respectively. At this end, there is provided an axle 34 with wheels 35 motorized at 36, the wheels being arranged twinned or in side-by-side pairs. One end of a support element 39 centrally supporting the axle 34 is connected to the end part 37 of the pantograph 31 by a further pin 38. The axle 34 can hence rotate about the pin 38 under the control of a respective actuator 40, such as a hydraulic cylinder acting as the steering member.

Figure 5:
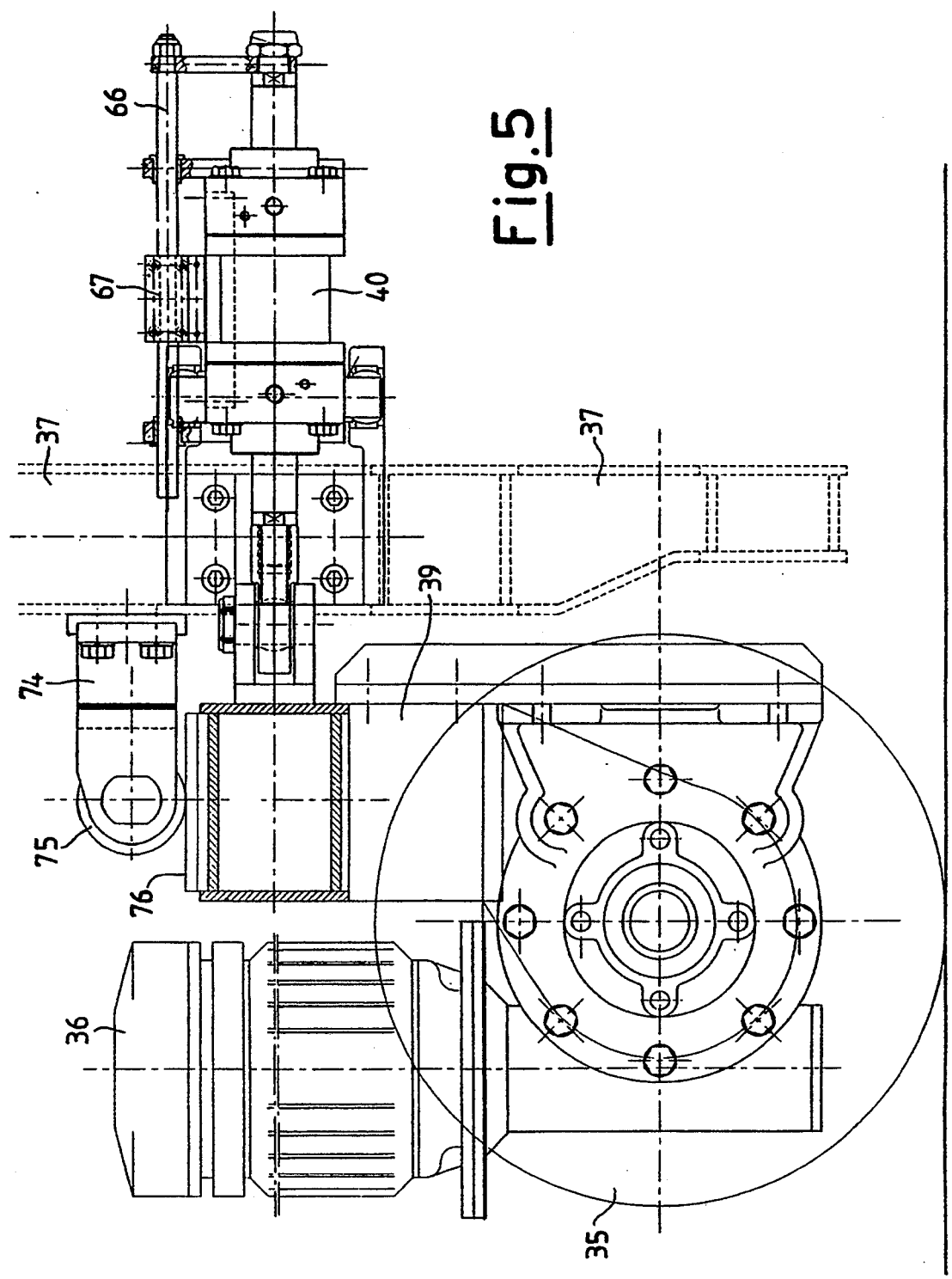
FIG. 5 is an enlarged side view at the manipulator-conveyor unit.
Figure 6:
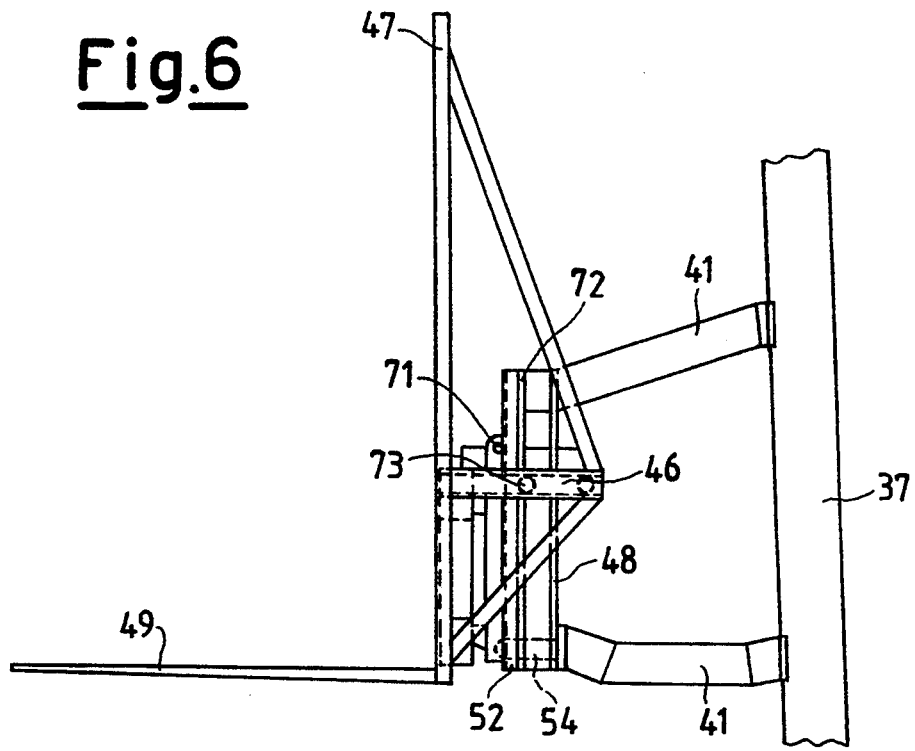
FIG. 6 is an elevational view of that part of the manipulator-conveyor unit of FIG. 2 comprising the forks.

FIG. 5 shows how a rod 66 is associated with the cylinder to act as a guide element cooperating with an encoder 67 for measuring the movement of the piston rod and hence the rotation of the axle 34. From the end part 37 of the pantograph 31 there also extend brackets 74 carrying rollers 75 providing counteracting force on an upper flat surface 76 forming part of the support element 39 for the axle The lifting and/or gripping means in the form of forks plus a control station 42 for an operator are rigidly fixed to the end part 37 of the pantograph 31 by brackets A laser emitter 43 is provided on the portal structure 30 to cooperate with a receiver or sensor 44 for measuring any deviation from the ideal trajectory provided by the laser beam located on the other end part 37 of the articulated pantograph 31.

The laser emitter 43 and the sensor 44 hence constitute means for measuring the movement of the manipulator-conveyor unit 17 above the support element. They are connected to a central processor 45 rigid with the rotatable support element 16 and also controlling the other functions and actuators of the apparatus of the invention.

The brackets 41 of the end part 37 of the pantograph 31 support a front crossmember 48 fixed to the brackets 41 and supporting a movable counter-crossmember 52.

The counter-crossmember 52 can be moved vertically on guide elements 72 and carries the lifting and/or gripping means in the form of forks arranged in a particular arrangement enabling their position to be adjusted. By way of at least one pair of cylinders 46 and relative horizontal guide elements 73, the counter-crossmember 52 supports a vertical protection grid 47, which is thus horizontally movable. The lifting means comprise two fixed forks 49 positioned nearly at the outer ends of the counter-crossmember 52 and four forks 50 movable thereon by respective actuator cylinders 51 for their movement.

Centrally between the crossmember 48 and the counter-crossmember 52, there is a lifting cylinder 53 for the forks 49, 50. Two cylinders 54 are also provided in a lower region of the counter-crossmember 52 to swivel it together with the protection grid 47 about an upper pivot 71 provided rigid with the guide elements 72. As can be seen from the figures, the articulated pantograph 31 and the manipulator-conveyor unit 17 are located essentially in a first half of the slide table 25, so that pallets 55 containing the products can be contained in the second half on the forks 49, 50. Below this part of the slide table 25 there are a plurality of vibrator elements 56 fixed at their other end to the upper plate 22 of the support element 16. Further actuators such as hydraulic cylinders 69 are provided to lock the slide table 25 when the manipulator-conveyor unit 17 is moving along it, so as not to overload the vibrators 56.

Movable vertical walls 58 are provided on flat supports 57 projecting from each side of this latter part of the slide table 25. The walls 58 are hinged by pairs of links 59 to the flat supports 57 and can be moved towards and/or away from each other by cylinders 60 also pivoted to the supports 57.

Hinged to each of the vertical end edges of the walls 58, there is a series of vertical flexible flaps 61. The flexible flaps 61 are mounted on a shaft 62, which can be made to rotate or rock by relative actuators 77, consisting, for example, of a rack and pinion arrangement. This rotation enables the vertical flaps 61 to turn through at least 270°, these flaps forming a rotary extension of the vertical compacting walls 58.

The free end of the slide table 25 is provided with a flat extension 63 hinged at 64 in a horizontal plane and rotatable by further actuators 65, such as cylinders, so as to act as a connection surface adjustable relative both to the load floor 12 and to the platform 11.

As is apparent from the aforegoing description, the apparatus of the present invention operates in the following manner.

An operator is advantageously positioned in the station 42 above the manipulator-conveyor unit 17 to easily control all its movements.

In general, to load a vehicle with products arranged on pallets the apparatus is set in the opposite position to that shown in FIGS. 1 and 2 so that it can be moved over the loading platform to withdraw the stacked pallets 55.

Figure 4:
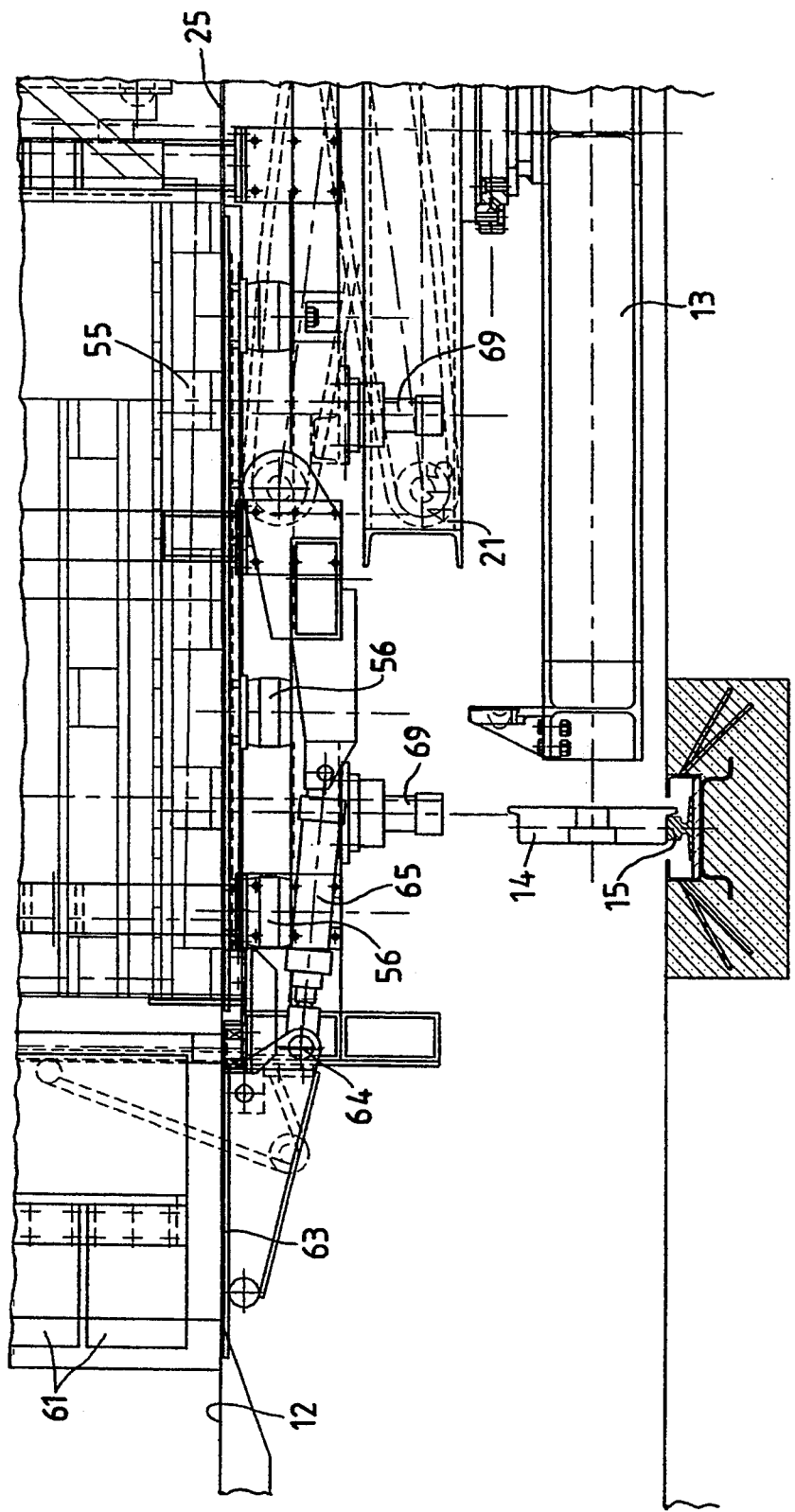
FIG. 4 is an elevational view of further enlarged details of the rear part of the apparatus.

Firstly, the hydraulic cylinder 24 is operated to move the upper plate 22 carrying the slide table 25 upwards guided by the pantograph levers 23. In this manner, the slide table 25 moves to the same height as the platform 11, with the flat extension 63 facing it in the position shown by dashed and dotted lines in FIGS. 2 and 4.

Having reached this position by rotating the toothed thrust bearing 18 driven by the underlying geared motor 19, it is locked by the cylinder 26 inserting its piston rod 27 into the relative bracket 28 to hence achieve stable positioning.

The flat extension 63 is then rotated until it is above the platform 11, the wheels 35 of the manipulator-conveyor unit then being operated to advance this flat extension from the slide table 25 to above the platform 11 for loading the pallets. During this, the pantograph 31, which is also slidable on wheels 33, forms the connection between the apparatus structure and the manipulator-conveyor unit 17, the laser emitter 43 and its receiver 44 being used as a fixed reference or an ideal path between the rotatable support element and the load pick-up region in cooperation with the central processor 45. In this respect, the laser beam from the laser emitter 43 acts as an optical track or fixed reference for the path.

In the event of deviation from the ideal path, the receiver 44 communicates with the central processor 45 which then operates the hydraulic cylinder 40. The axle 34 is hence steered to an extent such as to restore correct movement to the manipulator-conveyor unit 17, under the control of the encoder 67 associated with the cylinder.

When the forks 49, 50 have been inserted into the lowest pallet 55 of a stack and have raised the stack by the lifting cylinder 53, the manipulator-conveyor unit 17 returns along the slide table 25 until it is completely contained within it. The flat extension 63 disengages from the platform 11 to return to the raised vertical position, and the cylinder 26 withdraws its piston rod 27 from the bracket 28 to allow the support element to rotate.

The rotatable support element 16 is now rotated through 180° until that end carrying the pallets 55 faces the load floor 12 of a vehicle to be loaded.

During this rotation, after the central processor 45 has disengaged the hydraulic cylinders 69 from the bottom of the slide table 25, it activates the plurality of vibrator elements 56 connected to the slide table 25 below the region carrying the pallets 55.

Simultaneously, the movable vertical walls 58 are moved up to the stack of products on the pallets 55 by the cylinders 60, so cooperating in compacting and aligning any projecting products. The pallets 55 are hence compressed by the simultaneous action of the vibrators 56 and the vertical walls 58, to facilitate the achieving of optimum space take-up by the load. This is aided by the fact that the underlying vibration tends to suspend the material on the pallets so that the action of the compacting walls is facilitated by the absence of resistance to the movement towards the products.

The rotation continues until the cylinder 26 faces the second bracket 28 positioned 180° from the first, to again stabilize the position of the rotatable support element 16 relative to the load floor 12 of the vehicle. To restore rigidity to the slide table 25 and avoid overloading the vibrator elements 56 the hydraulic cylinders 69 are again operated to support the table. In addition, if, for example, the height of the vehicle load floor 12 is lower than the platform 11, the hydraulic cylinder 24 drags the upper plate 22 of the support element 16 down to the desired height.

The two sets of flexible flaps 61 are now rotated about the shaft 62 by the actuators 77 so as to penetrate a few centimeters between the vertical walls of the vehicle. In this position, the flaps 61 act as lead-in elements for the insertion of the stack of pallets 55, so preventing any jamming taking place, and hence acting as an actual rotating extension of the lateral compacting walls 58.

The wheels 35 of the axle 34 are again driven so that the manipulatore-conveyor unit 17 advances along the slide table and onto the vehicle load floor, to hence insert the stack of pallets 55 into the vehicle. After reaching the predetermined internal position and releasing the pallets from the forks 49, 50, the manipulator-conveyor unit 17 is returned to its initial position above the slide table 25. Again during this stage, as in the preceding stage in which the stack of pallets was withdrawn from the platform, the sensing means 43 and 44 enable a correct movement trajectory to be achieved.

Figure 7:
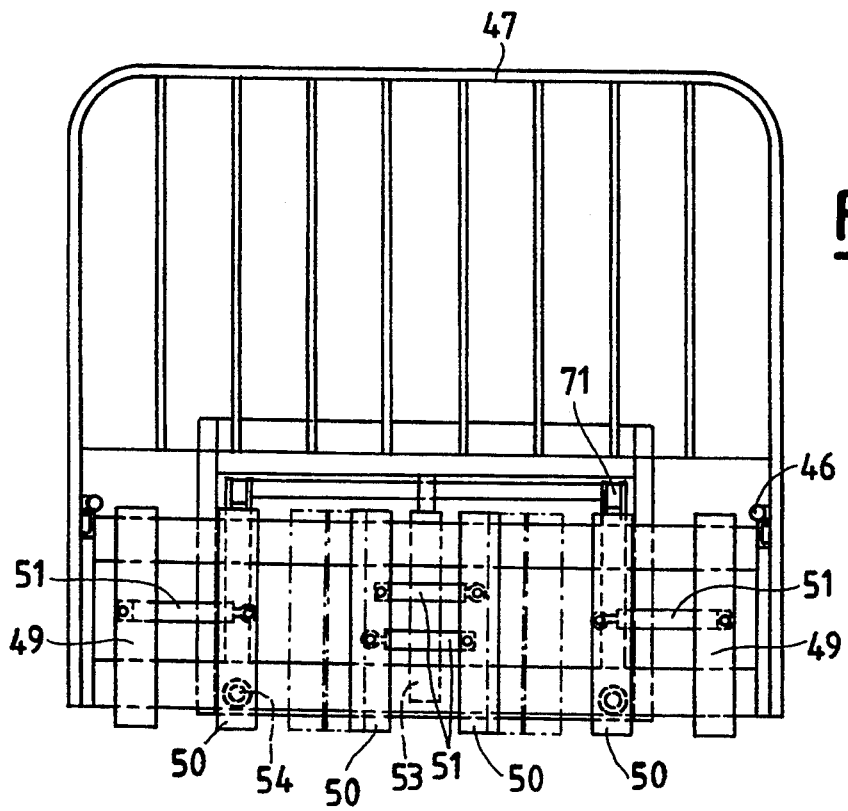
FIG. 7 is a front view of FIG. 6 showing two fork positions, one in full lines and the other in dashed and dotted lines.

This successive taking-up and setting-down of the pallet stacks continues until the vehicle is completely loaded. As initially stated, the arrangement of the load on the load floor inside the vehicle has to be optimized, this being achieved, for example, by loading two successive pallet stacks mutually rotated through 90°. As is well known, the crossmembers 68 of the pallets 55 are arranged differently in the two main directions, so that the forks 49 and 50 have to be adapted to this. This change in the fork position is effected immediately by the actuator cylinders 51 which move the four forks 50 along the counter-crossmember 52. FIGS. 7-9 show the two arrangements which satisfy this requirement.

In this respect, the cylinders 51 are able to make the forks 50 traverse so that they can be positioned either touching in pairs or all four separated by equal distances. This enables the forks to be inserted both into the short side and into the long side of the pallets.

FIG. 8 shows the forks 49 and 50 arranged equidistant and hence insertable into relative seats in the short side of three side-by-side pallets 55. FIG. 9 shows the forks 50 arranged in touching pairs to be inserted into two rows of two pallets each along their long sides.

In the arrangement of FIG. 8 it can be seen that it is necessary to move the vertical protection grid 47 forward by means of the pair of cylinders 46, so that the forks do not extent beyond the pallets 55.

It can hence be seen that an automated apparatus according to the present invention allows extremely rapid and correct loading and/or unloading of vehicles, with complete utilization of their load capacity.

I claim:

1. An automated apparatus for positioning between a loading platform and a vehicle positioning region for loading and unloading a load floor of a motor vehicle located in said vehicle positioning region, comprising:
   a base frame supported for horizontal movement laterally of said loading platform;

a manipulator-conveyor unit provided at one end thereof with at least one of a lifter and a gripper for articles to be loaded or unloaded;

a support element supporting said manipulator-conveyor unit, via at least one pair of motorized wheels, above and in relation to said base frame, for rotation through at least 180° about a vertical axis;

said manipulator-conveyor unit being substantially horizontally extensible for moving said at least one of a lifter and gripper alternately to a position above said loading platform and a position above said load floor;

an aligner between said base frame and said support element for aligning said support element with said load floor for facilitating transfer of articles from said manipulator-conveyor unit to said load floor and from said load floor to said manipulator-conveyor unit along a straight line;

a central processor;

sensors associated with said manipulator-conveyor unit for sensing movement of said manipulator-conveyor unit above said support element;

an actuator, operatively associated with said motorized wheels for actuating said motorized wheels for positioning said manipulator-conveyor unit;

said sensors being operatively associated with said central processor and said actuator, for causing said actuator to correctly position said manipulator-conveyor unit;

said sensors including at least one laser emitter supported on said support element, and at least one laser receiver supported on said manipulator-conveyor unit; said laser receiver being arranged to receive a laser emission from said laser emitter;

said manipulator-conveyor unit including a plurality of forks engageable with said articles for loading or unloading articles;

actuators associating at least some of said forks with a remainder of said manipulator-conveyor unit, for moving said forks horizontally laterally of said vehicle positioning region, whereby some of said forks are movable forks;

an articulated pantograph interposed between said manipulator-conveyor unit and said support element, said pantograph being fixed at one end to said support element, and having a free end supporting said manipulator-conveyor unit for horizontal longitudinal movement towards and away from said vehicle positioning region; and said forks being supported on said manipulator-conveyor unit via a fixed crossmember provided on said free end of said articulated pantograph, said crossmember supporting a counter-crossmember for vertical movement therealong; said forks being carried on said counter-crossmember.

2. The apparatus of claim 1, further comprising:

a vertically and transversally extending protection grid supported on said counter-crossmember for horizontal lateral movement; and actuators operatively installed between said counter-crossmember and said protection grid for horizontally laterally moving said protection grid relative to said counter-crossmember.

3. The apparatus of claim 1, further comprising:

a lifting cylinder operatively installed between said crossmember and said counter-crossmember, for vertically moving said counter-crossmember relative to said crossmember.

4. The apparatus of claim 1, wherein:

said counter-crossmember is mounted on said crossmember via guide elements which are vertically slidable on said crossmember as said counter-crossmember moves vertically relative to said crossmember; and further including pivots between said counter-crossmember and said guide elements for permitting pivoting of said counter-crossmember relative to said crossmember about a horizontal laterally extending axis.

5. The apparatus of claim 1, further including:

an upwardly facing slide table provided on said support element;

said motorized wheels being carried on at least one axle and being rollably supported on said slide table;

a wheel support element for said axle, said wheel support element having an upwardly facing flat surface;

a plurality of rollers carried by brackets extending from said free end of said pantograph and arranged to act on said flat surface as a counteracting system for said motorized wheels.

6. The apparatus of claim 1 further including:

an upwardly facing slide table provided on said support element, said slide table having an underside;

said motorized wheels being supported on said slide table;

a vibrator operatively associated with said underside of said slide table for vibrating said slide table and thereby articles being transferred by said manipulator-conveyor unit; and laterally spaced, horizontally laterally movable vertical walls supported on said supporting element and arranged for laterally confining articles being loaded onto said load floor by said manipulator-conveyor unit.

7. The apparatus of claim 6, wherein:

said vertical walls have vertical forward end edges disposed to be located adjacent said vehicle positioning region; and further including flexible flaps hinged to said vertical end edges of said vertical walls; and actuators operatively connected between said flexible flaps and said vertical walls, for pivoting said flexible flaps.

8. The apparatus of claim 6, wherein:

said vertical walls are supported from said slide table by levers which are hinged to flat supports which project from said slide table, for movement by actuators effectively associated between said vertical walls and said slide table.

9. The apparatus of claim 8, wherein:

said actuators effectively associated between said vertical walls and said slide table are arranged for rotating said levers through respective angles of up to 270°.

10. The apparatus of claim 1, further comprising:

an upwardly facing slide table provided on said support element;

said motorized wheels being supported on said slide table;

a flat extension hinged along a horizontal axis to said slide table at an end of said slide table for pivoting to provide an adjustable transitional connecting surface alternatively between said load floor and said loading platform.

* * * * *